(12) United States Patent
Schulz et al.

(10) Patent No.: US 10,989,804 B2
(45) Date of Patent: Apr. 27, 2021

(54) METHOD AND APPARATUS FOR OPTICAL DISTANCE MEASUREMENTS

(71) Applicant: Ibeo Automotive Systems GmbH, Hamburg (DE)

(72) Inventors: Raymond Schulz, Hamburg (DE); Hosam Alqaderi, Hamburg (DE)

(73) Assignee: IBEO AUTOMOTIVE SYSTEMS GMBH, Hamburg (DE)

(*) Notice: Subject to any disclaimer, the term of this patent is extended or adjusted under 35 U.S.C. 154(b) by 0 days.

(21) Appl. No.: 16/585,657

(22) Filed: Sep. 27, 2019

(65) Prior Publication Data

US 2020/0103518 A1 Apr. 2, 2020

(30) Foreign Application Priority Data

Oct. 2, 2018 (EP) .................................... 18198096

(51) Int. Cl.
| | |
|---|---|
| *G01S 17/89* | (2020.01) |
| *G05D 1/02* | (2020.01) |
| *G01S 13/86* | (2006.01) |
| *G01S 17/931* | (2020.01) |
| *G01S 7/48* | (2006.01) |

(52) U.S. Cl.
CPC .......... *G01S 13/865* (2013.01); *G01S 7/4808* (2013.01); *G01S 17/89* (2013.01); *G01S 17/931* (2020.01); *G06T 2207/10028* (2013.01)

(58) Field of Classification Search
None
See application file for complete search history.

(56) References Cited

U.S. PATENT DOCUMENTS

| | | | |
|---|---|---|---|
| 10,029,804 B1* | 7/2018 | Chamberlain | .......... G06T 7/194 |
| 2017/0124781 A1* | 5/2017 | Douillard | ......... G08G 1/096816 |
| 2017/0357267 A1* | 12/2017 | Foster | .................. A01B 69/008 |
| 2018/0203124 A1* | 7/2018 | Izzat | ..................... G01S 13/865 |
| 2018/0232947 A1 | 8/2018 | Nehmadi et al. | |
| 2019/0004534 A1* | 1/2019 | Huang | ................. G05D 1/0088 |
| 2019/0164018 A1* | 5/2019 | Zhu | ........................... G06T 7/11 |

FOREIGN PATENT DOCUMENTS

EP 3349041 A1 7/2018

OTHER PUBLICATIONS

European Search Report, issued for the corresponding European Patent Application No. 18198096, dated Apr. 3, 2019.

* cited by examiner

*Primary Examiner* — John F Mortell
(74) *Attorney, Agent, or Firm* — Myers Wolin, LLC

(57) ABSTRACT

A method for optical distance measurements is suggested which comprises carrying out Radar measurements, building a grid map comprising a plurality of elements based on the Radar measurements, extracting information about the dynamic state of each element and assigning the information to the respective element. The method further comprises carrying out Lidar measurements resulting in a Lidar point cloud and associating the Lidar point cloud with the grid map.

11 Claims, 3 Drawing Sheets

METHOD AND APPARATUS FOR OPTICAL DISTANCE MEASUREMENTS

CROSS REFERENCE TO RELATED APPLICATIONS

This application takes priority from European Application No. 18198096.2 filed on Oct. 2, 2018, the contents of which are incorporated by reference herein.

TECHNICAL FIELD

The present invention relates to a method as well as an apparatus for optical distance measurements.

BACKGROUND

Using Lidar measurement for perceiving the environment of a vehicle is generally known. Lidar measurements are based on sending out measurement pulses and receiving the reflections of these pulses on objects in the environment of the vehicle. Based on the time of flight method, the distance to the objects on which the measurement pulses have been reflected can be determined.

However, a major disadvantage of Lidar is that it is incapable of providing velocity information of the objects on which the measurement pulses have been reflected. For example, in a complex driving scenario, the data association is very challenging, since with a high-resolution sensor the measurements reflected on dynamic objects are hardly distinguishable from other measurements generated from nearby static objects. This results in a very challenging and degraded data association since the performance of dynamic object tracking and static object representation is strongly affected.

SUMMARY

An objective of the present invention is to improve a method for optical distance measurements in such a way that it takes into account whether a measurement is the result of a reflection on a dynamic or a static object. In other words, the data association should be improved.

This objective is solved by a method for optical distance measurements wherein the method comprises carrying out Radar measurements and building a grid map comprising a plurality of elements based on the Radar measurements, preferably based only on the Radar measurements. Further, the method comprises extracting information about the dynamic state of each element based on the Radar measurements and assigning the information to the respective element. In addition, Lidar measurements are carried out resulting in a Lidar point cloud, wherein the method comprises associating the Lidar point cloud with the grid map.

The method for optical distance measurements particularly serves for navigating a vehicle, in particular for navigating a vehicle by autonomous driving. For this purpose, the distance to any objects within a surrounding and/or within a measurement area of an apparatus for carrying out the method is preferably determined by the above described method.

The term "Radar measurements" refers to measurements using radio waves to determine the distance to objects. The method particularly comprises sending out radio waves which are reflected on objects in a measurement area. The measurement area particular represents an area which is measured by means of sending out radio waves. The measurement area is particularly understood as the field of view, here Radar field of view. The field of view especially represents an area which is observable by a respective receiving unit, such as e.g. a Radar sensor. The radio waves are reflected wherein the reflections are received. In particular, the measurement area is scanned by the radio waves. In other words, the method comprises scanning a measurement area by carrying out Radar measurements. In particular, imaging radar is used so that further preferred as a result of the Radar measurements an image of the measurement area is obtained.

A great advantage of Radar is that it is capable of determining the velocity of the objects on which the radio waves have been reflected. In particular, the relative radial velocity is determined. The term "relative radial velocity" refers to the relative velocity between an apparatus for carrying out the method which might also be moving and the possibly dynamic and thus moving objects, wherein this relative velocity is determined in a radial direction. The Radar measurements, in other words the results of the Radar measurements, are used to build a grid map which comprises a plurality of elements. The term "element" can refer to a grid element.

The grid map could be a 3D voxel grid map such that the elements are voxels. A voxel preferably represents a value on the 3D voxel grid map wherein the map can be based on a regular grid in three-dimensional space. Alternatively, the grid map could be a 2D grid map comprising cells or in other words pixels as elements.

In particular, the grid map represents the measurement area which has been measured by means of the Radar measurements. Especially, each element of the grid map represents a part or in other words segment of the measurement area, so that each element relates to and can be assigned to a respective part of the measurement area. In other word, the grid map is a discrete representation of the measurement area in either 2D or 3D. In particular, the grid map discretizes the measurement area, and thus advantageously the surrounding of a respective apparatus for distance measurements, into a set of elements, either into a set of cells or in other words pixels in 2D or into a set of voxels in 3D, where each element represent a unique location in the measurement area.

The method comprises extracting information about the dynamic state of each element and assigning the information to the respective element. The dynamic state of each element represents the dynamic state of the objects within the corresponding part of the measurement area. Thus, the method advantageously comprises extracting information on the dynamic state of the respective part of the measurement area and assigning it to the corresponding element.

Further, the method can comprise estimating the dynamic probability of each element. In particular, the grid map is a probabilistic grid map representing the probability of dynamics of the measurement area in which the Radar measurements have been carried out. Since the elements of the grid map each represent a part of the measurement area in which the Radar measurements have been carried out, the dynamic state of each element directly relates to the dynamic state of the respective part of the measurement area. For example, if an element has a very low dynamic probability, this means that within the respective part of the measurement area, it is very likely that only static objects have been detected, in other words that the radio waves have only been reflected on static objects in this part of the measurement area.

For example, the dynamic probability could range from 0% to 100%, wherein 0% refers to a certainty of a static state and 100% to a certainty of a dynamic movement. The dynamic probabilities will lie between these minimum and maximum values so that for example a dynamic probability of 80% is still an indicator of a high probability that within the respective part of the measurement area a moving object is present.

Since by using Radar it is possible to extract information about the velocity, especially the relative radial velocity, of the objects on which the radio waves have been reflected, the Radar measurements can be used to extract information about the dynamic state of each element of the grid map. This information is assigned to the respective element. Advantageously, the grid map therefore represents the dynamic state of the measurement area in which the Radar measurements have been carried out.

The method further comprises carrying out Lidar measurements resulting in a Lidar point cloud. In particular, carrying out the Lidar measurements comprises sending out measurements pulses and receiving their reflections. A measurement pulse is in particular an electromagnetic, preferably an optical, signal. The measurements pulses have in particular a wave length which is not visible to the human eye. Advantageously, invisible infrared is used. Preferably, the measurement pulses each have a pulse duration so that the measurement pulses can be understood as a time derestricted portions of electromagnetic radiation. Since the measurement pulse is an electromagnetic signal and its velocity is thus known, the distance to the object on which a measurement pulse has been reflected can be determined by measuring the time the measurement pulse needs to return. In particular, each point of the Lidar point cloud represents the result of a Lidar measurement meaning having received a reflected measurement pulse. The Lidar point cloud is advantageously a 3D point cloud meaning that the points of the Lidar measurements are not disposed in one plane but in three dimensional space.

Advantageously, carrying out the Lidar measurement particularly comprises sending out measurement pulses which are reflected on objects in a measurement area. The measurement area is particularly understood as the field of view, here Lidar field of view. The field of view especially represents an area which is observable by a respective receiving unit, such as e.g. a Lidar sensor. Advantageously, the Lidar measurements are carried in the same measurement area as the Radar measurements. In other words, the Lidar field of view and the Radar field of view are at least overlapping or identical. In particular, carrying out the Lidar measurements means scanning the same measurement area as when it comes to the Radar measurements.

According to the invention, the method comprises associating the Lidar point cloud with the grid map. In particular, the Lidar point cloud comprises points wherein each point represents the result of a Lidar measurement. One Lidar measurement is preferably to be understood as sending out a measurement pulse and receiving it after it has been reflected.

In particular, each point of the Lidar point cloud is associated with at least one element of the grid map. Advantageously, each point of the Lidar point cloud is assigned to at least one element of the grid map.

By extracting information about the dynamic state of each element of the grid map based on the Radar measurements the method according to the invention takes into account the velocity information about the measurement area. By associating a Lidar point cloud resulting from the Lidar measurements with the grid map containing information about the dynamic state of each element it can be taken into account whether a point of the Lidar point cloud is the result from the reflection on a dynamic object or a static object. The availability of this information improves the performance of the method for optical distance measurements. In particular, the data association which becomes challenging in difficult driving scenarios, can vastly be increased. In this sense, data association refers to assigning each measurement to the correct object from which the measurement has arisen. In other words, the goal of data association is to know which measurement belongs to which target.

In particular, the above method is a Lidar-based fusion method for distance measurements, since the method fuses Radar and Lidar information.

Preferably, the method comprises estimating the dynamic probability of each element. Estimating the dynamic probability of each element means that it is estimated with which probability the objects on which the radio waves of the Radar measurements have been reflected are at the moment and/or will be in the future static or dynamic. Especially, the dynamic probability of each element in the future is determined based on previous measurements regarding the same element. Thus, the method can comprise estimating the dynamic probability regularly, saving the probabilities and using them to estimate the dynamic probability for the future. The dynamic probability of the element can be modelled as a stochastic point process, in particular a nonhomogeneous Poisson process.

The method can further comprise extracting information about the occupancy of each element based on the Radar measurements and assigning the information to the respective element. The occupancy of the elements represents the presence of objects within the corresponding part of the measurement area. Thus, the method advantageously comprises extracting information about the occupancy of a respective part of the measurement area by means of the Radar measurements and assigning it to the corresponding element. The occupancy probability is particularly estimated using a binary Bayes filter. In particular, the method comprises estimating the probability of occupancy of each element and/or classifying each element as occupied or not occupied. The grid map can therefore represent an occupancy grid map.

In particular, each point of the Lidar point cloud is associated with more than one element of the grid map. Associating the Lidar point cloud with a grid map can comprise projecting the Lidar point cloud into the grid map. In other words, each point of the Lidar point cloud is projected into the grid map.

After projecting a point of the Lidar point cloud into the grid map the method can further comprise determining the nearest elements of the grid map to this point. In particular, a radius is predetermined and each element within this radius around the projected point is associated.

Especially, all elements of the grid map are equally sized, defined by one size in each dimension. The radius could for example be between one time and three times, especially between one time and two times, the size of the elements, in particular the largest size of the elements.

The method can further comprise checking the dynamic probabilities of the nearest and thus associated elements. For each point of the Lidar point cloud the method advantageously comprises determining the average of the dynamic probabilities of the associated elements of the grid map, and comparing the average with a predetermined threshold for classifying the point as static or dynamic. The average could be a weighted average, meaning that the dynamic probabilities of some elements have more "weight" compared to others. For example, some elements of the nearest elements which are closer to the point could have a higher "weight" when determining the average than other elements of the nearest elements which are disposed further away from the point. Alternatively, the average could not be weighted, so that each of the nearest elements is equally weighted.

The method can comprise classifying each point of the Lidar point cloud as dynamic or static. If the average lies above the threshold, the respective point of the Lidar point cloud is classified as dynamic. If the average lies under the threshold, the point is classified as static. If a point is classified as static, this means that the point very likely resulted from a reflection on a static object. If a point is classified as dynamic, this means that the point very likely resulted from a reflection on a dynamic object. For example, the threshold could be set at 70%.

By means of the classification, the method is capable distinguishing between points of the Lidar point cloud resulting from the reflection on static objects and points of the Lidar point cloud resulting from the reflection on moving objects. In other words, it is possible for each point of a Lidar point cloud to determine whether the respective Lidar measurement pulse had been reflected on a static or a dynamic object. This can be achieved due to the association between the Lidar point cloud and the grid map. As a consequence, the method significantly improves the ambiguous data association between Lidar points reflected from static and dynamic objects. In other words, points classified as resulting from the reflection on static objects will not be associated with dynamic objects and vice versa. As a result, the method is capable to separate points within the same point clouds based on the dynamics of the objects on which the respective Lidar measurement pulses have been reflected.

Preferably, the method further comprises building a Lidar-based static grid map, especially a Lidar-based static grid map. This Lidar-based static grid map is preferably based on the points of the Lidar point cloud having been classified as static, meaning the points which result from the reflection on static objects. The Lidar-based static grid map serves to represent all the static objects in the measurement area. The Lidar-based static grid map can be constantly updated, preferable after each scan, and the static objects can be confirmed.

In particular, the method comprises carrying out numerous scans of Radar and Lidar wherein a Lidar scan follows a Radar scan or the Lidar scan and the Radar scan are carried out at the same time. In particular, the Lidar-based static grid map is updated each time after carrying out a Lidar scan. Since the data association is vastly improved, the Lidar-based static object representation is not wrongly updated by dynamic points of a Lidar point cloud. Therefore, the static object representation as well as the confirmation of static objects after each scan is greatly improved.

The method can further comprise Lidar-based tracking of dynamic objects. In particular, the Lidar-based tracking of dynamic objects is based on the points of the Lidar point cloud having been classified as dynamic, meaning the points resulting from the reflection on moving objects. Advantageously, only Lidar points reflected on moving objects are considered.

In particular, the Lidar-based tracking of dynamic objects comprises a data association for tracking. Points of the Lidar point cloud resulting from the Lidar measurements are distinguished between having being the result of a reflection of the respective measurement pulse on a static object or a dynamics object. The points resulting from dynamic objects are initialized for tracking. These points represent the dynamic objects to be tracked. After each Lidar scan these points, or in other words the dynamic objects which they represent, are validated and followed so that a tracking is enabled. Since the data association is improved, the track initialization and validation of dynamic objects are enhanced. Only points resulting from the reflection on dynamic objects will be considered in the data association process for the Lidar-based tracking. Consequently, this will reduce the number of wrongly associated points with dynamic objects. Furthermore, the computation time for the Lidar-based tracking data association will be reduced.

In particular, the method comprises extracting a drivable space for a vehicle based on the Lidar-based static grid map and the Lidar-based tracking of dynamic objects. In particular, the method serves for extracting a drivable space for a vehicle, in particular for navigating the vehicle, advantageously by autonomous driving.

In another aspect, the invention relates to an apparatus for optical distance measurements wherein the apparatus is capable of carrying out an above described method. In particular, the apparatus is configured to carry out an above described method. The apparatus can serve for the navigation of a vehicle, in particular by autonomous driving. For this purpose, the apparatus is particularly disposed on the vehicle to be navigated, in particular in its front area.

The apparatus particularly comprises a transmission unit wherein the transmission unit further preferred comprises a Lidar source for transmitting measurements pulses for the Lidar measurements, particularly a plurality of lasers. Especially, the Lidar source is configured as a laser array. Further, the transmission unit can comprise a Radar source for transmitting radio waves.

The apparatus can comprise a receiving unit which further preferred has a Radar sensor for receiving the reflection of the radio waves as well as a Lidar sensor for receiving the reflection of the measurements pulses of the Lidar measurements. The Lidar sensor particularly comprises a plurality of receiving elements which are configured as diodes, in particular avalanche photodiodes, most preferred single photon avalanche diodes, or pin diodes.

Furthermore, the apparatus can comprise a control unit for controlling the transmission unit as well as the receiving unit. The apparatus can further comprise an evaluation unit for carrying put the above method. In particular, the apparatus is a Lidar-based fusion system in which Lidar and Radar are fused.

In particular, the apparatus is a time of flight detector.

Furthermore, the invention relates to computer program product, comprising a computer-readable storage medium on which a program is stored, which, after being loaded into the memory of a computer, enables the computer to carry out an above described method in cooperation with an above described apparatus.

In addition, the invention relates to a computer-readable storage medium on which a program is stored, which, after being loaded into the memory of the computer, enables the computer to carry out an above described method in cooperation with an above described apparatus.

BRIEF DESCRIPTION OF THE DRAWINGS

It is shown in a schematic way in.

DETAILED DESCRIPTION OF PREFERRED EMBODIMENTS

Figure 1:
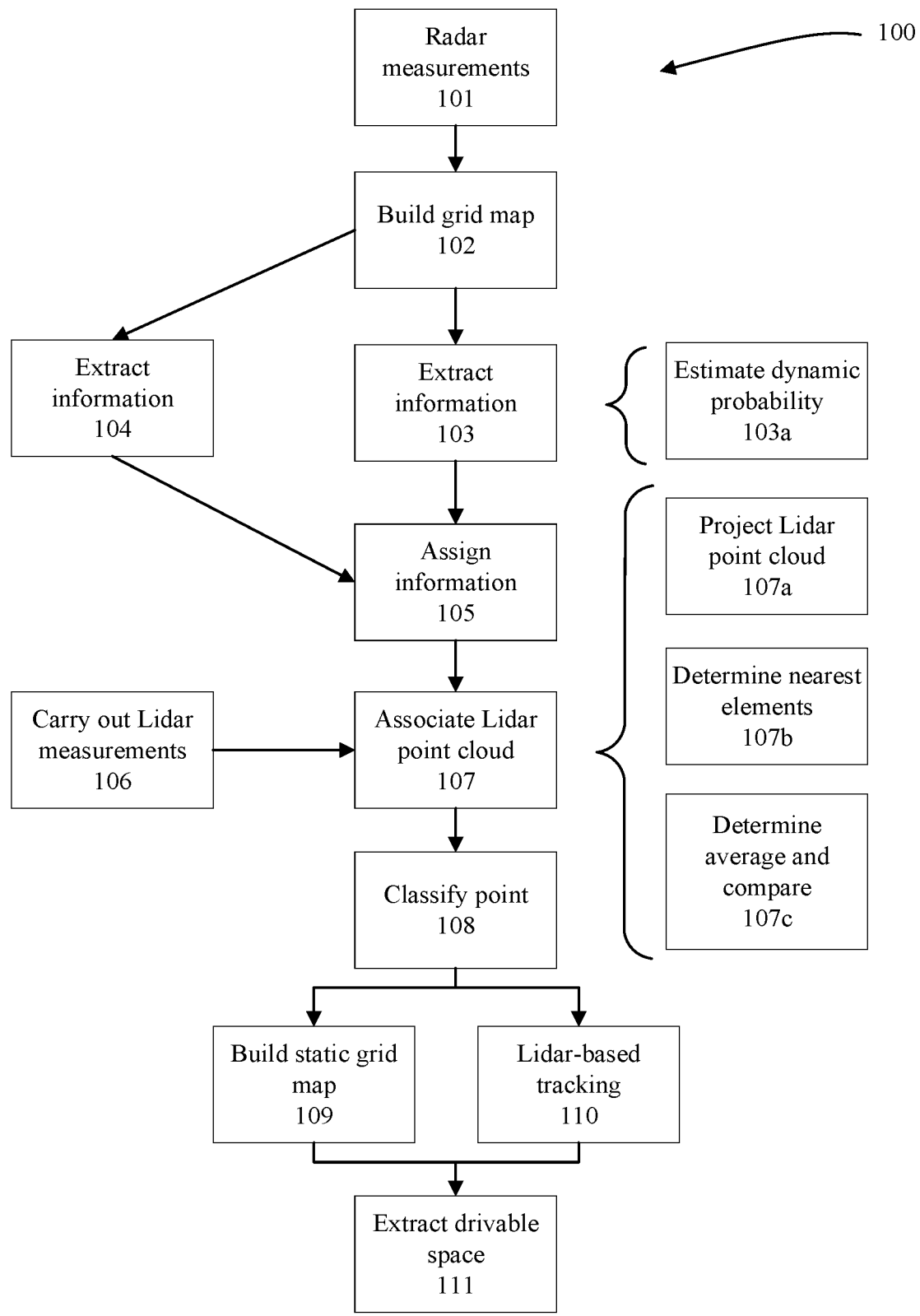
FIG. 1 a flow diagram of a method according to the invention.

In FIG. 1 a flow diagram of a method according to the invention (100) is shown. The method comprises carrying out (101) Radar measurements as well as building (102) a grid map comprising a plurality of elements. The method comprises extracting (103) information about the dynamic state of each element and assigning (105) the information to the respective element.

For extracting (103) the information about the dynamic state of each element, the method (100) can comprise estimating (103a) the dynamic probability of each element.

In addition, the method can comprise extracting (104) information about the occupancy of each element. In particular, the probability of occupancy of each element is estimated and each element is classified as occupied or not occupied. Further, the method (100) can include assigning (105) the information about the occupancy of each element to the respective element.

Furthermore, the method comprises carrying out (106) Lidar measurements resulting in a Lidar point cloud as well as associating (107) the Lidar point cloud with the grid map. The latter step preferably comprises projecting (107a) the Lidar point cloud into the grid map and further preferred determining (107b) for each point of the Lidar point cloud the nearest elements of the grid map and even further preferred determining (107c) the average of the dynamic probabilities of the nearest elements of the grid map as well as comparing the average with a predetermined threshold.

The method can further comprise classifying (108) each point of the Lidar point cloud as dynamic or static based on the above comparison with the predetermined threshold.

Furthermore, the method can comprise building (109) a Lidar-based static grid map which is preferably based on the points of the Lidar point cloud resulting from the reflection on static objects. The method can further comprise Lidar-based tracking (110) of dynamic objects preferably based on the points of the Lidar point cloud resulting from the reflection on dynamic objects. Furthermore, preferably based on both the Lidar-based static grid map as well as the Lidar-based tracking of dynamic objects, the method (100) can comprise extracting (111) a drivable space for a vehicle.

Figure 2:
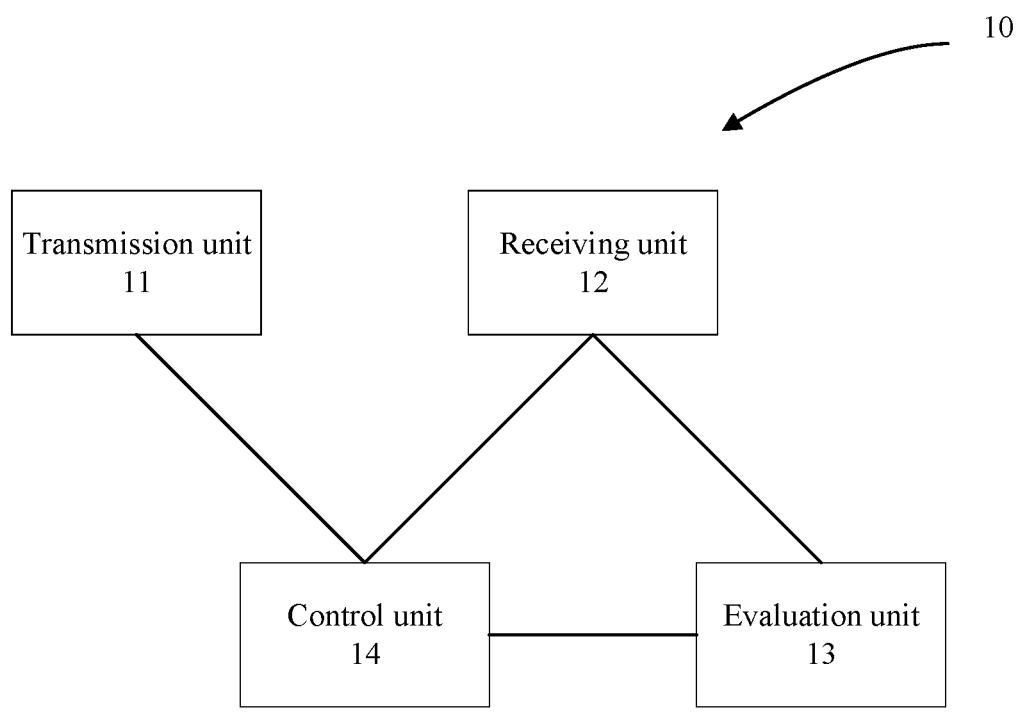
FIG. 2 an apparatus according to the invention.

FIG. 2 shows an apparatus (10) according to the invention comprising a transmission unit (11) which preferable comprises a Lidar source and a Radar source.

The apparatus (10) further comprises a receiving unit (12), preferably a receiving unit for Lidar and Radar each as well as an evaluation unit (13) and a control unit (14) which is configured to control the transmission unit (11), the receiving unit (12) as well as the evaluation unit (13).

Figure 3A:
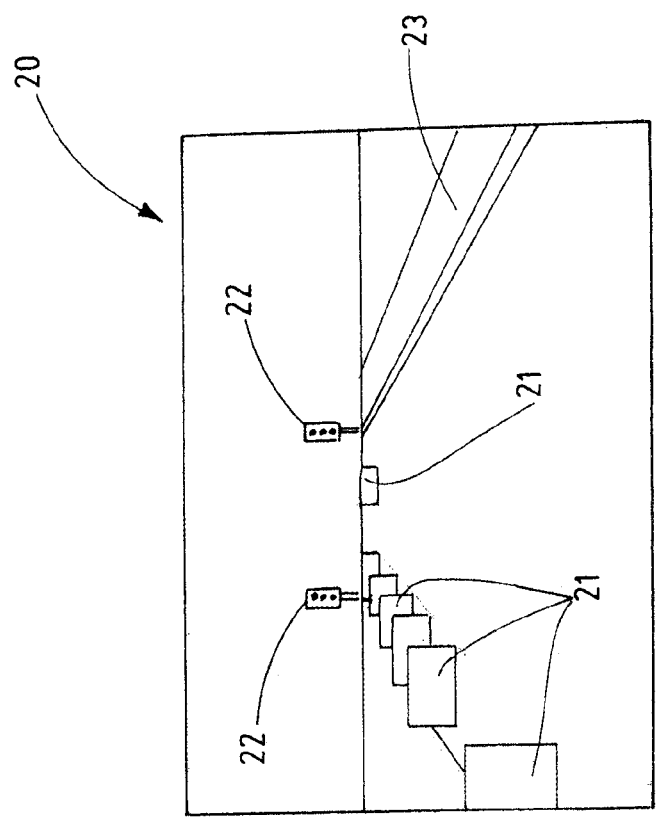
FIG. 3a a picture of a driving scenario.

FIG. 3a shows a driving scenario (20) of a vehicle comprising an apparatus (10) according to the invention for carrying out a method (100) according to the invention.

Within this driving scenario (20) there are multiple cars (21) which have been represented by rectangles for reasons of simplicity. Furthermore, the driving scenario (20) comprises traffic lights (22) as well as a sidewalk (23). Using Lidar alone could not result in any information about the velocity of the cars (21) within the driving scenario. However, by using the method according to the invention, information about the dynamic and static regions in the driving scenario can be determined.

Figure 3B:
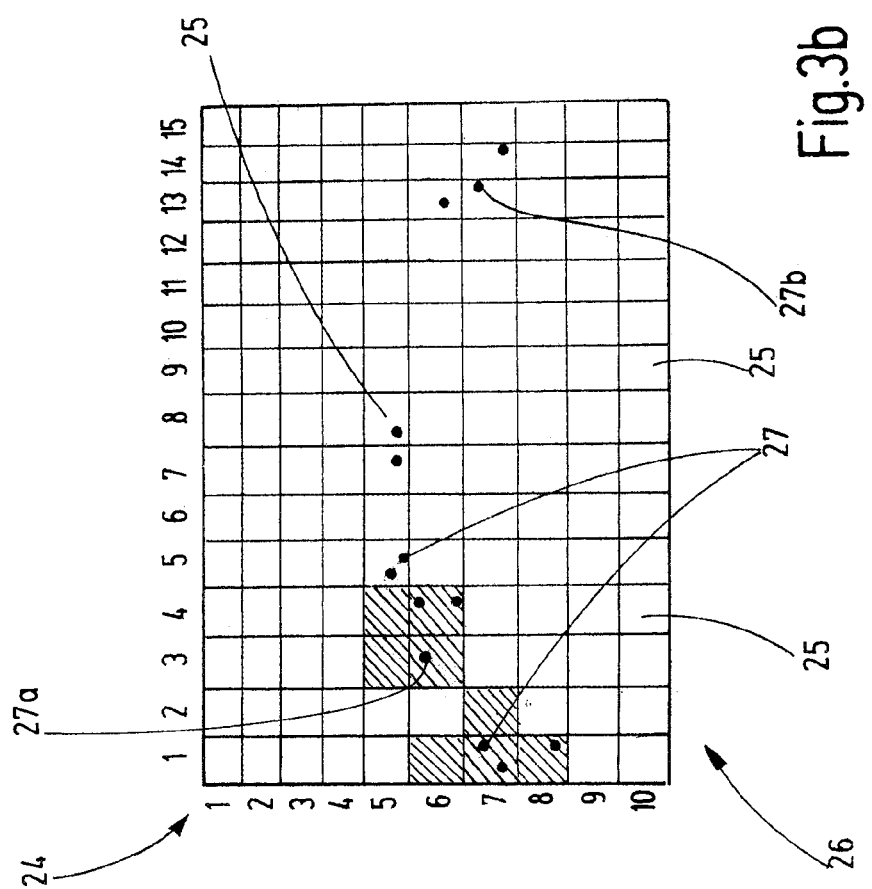
FIG. 3b a grid map with an associated Lidar point cloud.

FIG. 3b shows a grid map (24) of the driving scenario (20) of FIG. 3a. The grid map (24) comprises elements (25) wherein each element relates to and can be assigned to a respective part of the driving scenario (20), in this case by projecting the grid map (24) onto the driving scenario (20). The grid map (24) of FIG. 3b is highly simplified.

In the present case, elements with a high dynamic probability are shown in a dashed way. Namely, the elements (25) in line 5, columns 3 and 4, line 6, columns 1, 3 and 4, line 7, columns 1 and 2 and line 8, column 1. These elements (25) which obviously correspond to the car (21) on the very left side of the driving scenario (20) as well as the car in front of this car, i.e. the second car (21) to the left in the driving scenario (20). This result of the method (100) is only natural, since the driving scenario (20) shows cars (21) lining up in front of traffic lights (22). The cars (21) which are arranged directly in front of the traffic lights (22) have already deaccelerated and are therefore static, while the cars (21) approaching the "traffic jam" in front of the traffic lights (22) are still dynamic.

In addition, a Lidar point cloud (26) comprising multiple points (27) is shown in FIG. 3b which have been associated with the grid map (24) by projection. The points (27) obviously result from the reflection of the respective measurement pulses on the cars in the driving scenario (20) (these are the points in columns 1, 3, 4, 5, 7 and 8) as well as from reflections of the respective measurement pulses on the sidewalk (23) (these are the points in columns 13 and 14).

Each point is associated with the nearest elements of the grid map (24). For example, a first point (27a) is shown which has been projected into the element (25) in line 6, column 3. The method (100) comprises determining the nearest elements within a certain predetermined radius. Theses nearest elements are in this case the elements (25) in line 5, columns 3 and 4, and line 6, columns 3 and 4. The first point (27a) is associated with these four elements. The method (100) comprises determining the average of the dynamic probabilities of these elements (25) and comparing it with a threshold. Since all the nearest elements have a high dynamic probability as can be seen by the dashed representation, the average lies above the threshold and the first point (27a) is classified as dynamic.

A second example is explained with respect to a second point (27b) which is projected into the element (25) in line 7, column 13. Within a predetermined radius around this point, the nearest elements are determined which are those in line 6, columns 13 and 14, and line 7, columns 13 and 14. The average dynamic probability of these elements (25) lies beneath the predetermined threshold, so that the second point (27b) is classified as static.

Thus, by associating the Lidar point cloud (26) with the grid map (24) points resulting from the reflection on static objects can be separated from points resulting from the reflection on dynamic objects. While the points resulting from the reflection on dynamic objects can thus be used for Lidar-based object tracking, the points resulting from the reflection on static objects are used for building a Lidar-based static grid map representing the static objects in the driving scenario (20).

What is claimed is:

1. A method for optical distance measurements, wherein the method comprises:
   carrying out Radar measurements, building a grid map comprising a plurality of elements based on the Radar measurements, wherein the method further comprises extracting information about the dynamic state of each element based on the Radar measurements, assigning the information to the respective element and carrying out Lidar measurements resulting in a Lidar point cloud, wherein the method further comprises associating the Lidar point cloud with the grid map, wherein the method further comprises estimating the dynamic probability of each element, wherein associating the Lidar point cloud with the grid map comprises projecting the Lidar point cloud into the grid map, and determining for each point of the Lidar point cloud the nearest elements of the grid map, wherein the method further comprises for each point of the Lidar point cloud determining the average of the dynamic probabilities of the nearest elements of the grid map and comparing the average with a predetermined threshold for classifying the point as static or dynamic.

2. The method of claim 1, wherein the method further comprises extracting information about the occupancy of each element based on the Radar measurements and assigning the information to the respective element.

3. The method of claim 1, wherein the method further comprises classifying each point of the Lidar point cloud as dynamic or static.

4. The method of claim 1, wherein the method further comprises building a Lidar-based static grid map.

5. The method of claim 4, wherein the LIDAR-based static grid map is based on the static points of the Lidar point cloud.

6. The method of claim 1, wherein the method further comprises LIDAR-based tracking of dynamic objects.

7. The method of claim 6, wherein the method further comprises classifying each point of the Lidar point cloud as dynamic or static, and wherein the LIDAR-based tracking of dynamic objects is based on the dynamic points of the Lidar point cloud.

8. The method of claim 4, wherein the method further comprises extracting a drivable space for a vehicle based on the LIDAR-based static grid map and a LIDAR-based tracking of dynamic objects.

9. An apparatus for optical distance measurements, wherein the apparatus is capable of carrying out a method, wherein the method comprises:

carrying out Radar measurements, building a grid map comprising a plurality of elements based on the Radar measurements, wherein the method further comprises extracting information about the dynamic state of each element based on the Radar measurements, assigning the information to the respective element and carrying out Lidar measurements resulting in a Lidar point cloud, wherein the method further comprises associating the Lidar point cloud with the grid map, wherein the method further comprises estimating the dynamic probability of each element, wherein associating the Lidar point cloud with the grid map comprises projecting the Lidar point cloud into the grid map, and determining for each point of the Lidar point cloud the nearest elements of the grid map, wherein the method further comprises for each point of the Lidar point cloud determining the average of the dynamic probabilities of the nearest elements of the grid map and comparing the average with a predetermined threshold for classifying the point as static or dynamic.

10. A non-transitory computer-readable storage medium on which a program is stored, which, after being loaded into the memory of a computer, enables the computer to carry out a method in cooperation with an apparatus wherein the method comprises:

carrying out Radar measurements, building a grid map comprising a plurality of elements based on the Radar measurements, wherein the method further comprises extracting information about the dynamic state of each element based on the Radar measurements, assigning the information to the respective element and carrying out Lidar measurements resulting in a Lidar point cloud, wherein the method further comprises associating the Lidar point cloud with the grid map, wherein the method further comprises estimating the dynamic probability of each element, wherein associating the Lidar point cloud with the grid map comprises projecting the Lidar point cloud into the grid map, and determining for each point of the Lidar point cloud the nearest elements of the grid map, wherein the method further comprises for each point of the Lidar point cloud determining the average of the dynamic probabilities of the nearest elements of the grid map and comparing the average with a predetermined threshold for classifying the point as static or dynamic.

11. The method of claim 4, wherein the LIDAR-based static grid map is based on the static points of the Lidar point cloud.

* * * * *